Patented June 29, 1926.

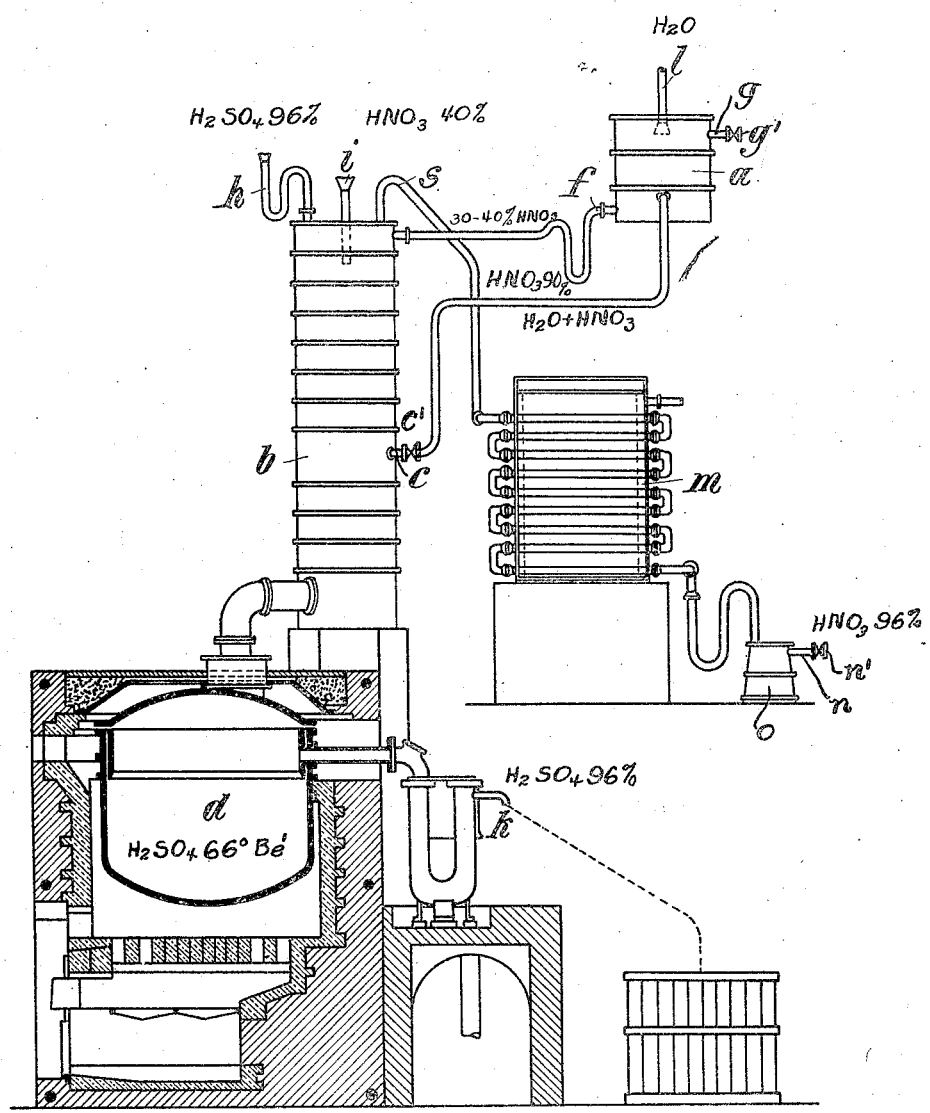

1,590,494

UNITED STATES PATENT OFFICE.

WILLI BÜSCHING, OF HALLE, GERMANY.

PROCESS OF CONCENTRATING NITRIC ACID IN A COLUMN.

Application filed May 14, 1923, Serial No. 638,863, and in Germany August 17, 1922.

As is well known dilute nitric acid can not be concentrated to a strength above 68%, by simple or rectifying evaporation because at that stage the strength of the residue is equal to that of the vapour. If higher concentration is desired, dehydrating means have to be employed, to which end sulphuric acid is particularly suitable. The procedure hitherto employed has the disadvantage of requiring a high amount of sulphuric acid and consequently also much heat, the latter being again partly dependent on the amount of sulphuric acid used. The process employed up to now consists mainly in bringing a suitable mixture of sulphuric and nitric acids into a column-like evaporation apparatus into which enters a counter current of steam which is absorbed by the sulphuric acid, causing thereby the liberation of heat by which the nitric acid is evaporated. In all these cases the resulting diluted sulphuric acid unless otherwise serviceable has of course to be freed from its absorbed water in order to render it again suitable to be returned to the process.

According to another process, where a boiler for sulphuric acid is placed before the evaporation column and where the water vapours from that acid serve as a source of heat, it is possible to distil the nitric acid from a mixture of nitric and sulphuric acids nearly free of water. But the sulphuric acid is thereby diluted and has to be freed again from its absorbed water just as with the former process.

Now I have found that sulphuric acid can be kept in the boiler in a highly concentrated state and thus can be returned again to the nitric-sulphuric acid mixture, provided that part of the water vapour—the amount of which corresponds with the water content of the introduced nitric acid—is withdrawn from the process by being turned away from the evaporation-column into and through a rectification column where the last vestige of nitric acid is retained.

The attached drawing illustrates one example of a plant in which the process can be put into practice:

The boiler $d$ contains highly concentrated 66° Bé. sulphuric acid the vapours of which are introduced from below into a standard evaporation-column $b$ while at the top of the column at $h$ the strong sulphuric acid (96%), necessary for the high concentration of the nitric acid, and at $i$ the dilute nitric acid to be concentrated are introduced.

The hot vapours of the sulphuric acid entering the column from below complete the concentration of the nitric acid entered above, because the heat generated is sufficiently great to convert the water originally contained in the nitric acid into steam which is removed at $c$ from the counter current. To recover any acid carried away with that portion of steam the latter may be caused to pass through a distilling vessel $a$ of standard type where it undergoes an additional rectification, the acid condensate being returned through a pipe $f$ to the evaporation-column, while the pure steam can be made to leave the vessel at $l$ for other uses.

The concentrated nitric acid vapours pass out of the column at $s$ to be condensed in a condenser $m$ and flow out from there in the highly concentrated form desired into a closed collecting receptacle $o$.

The following arrangement is utilized for driving off the vapors.

The rectifying vessel $a$ is provided with a suction pipe $g$ closable by valve $g'$, and the collecting receptacle $o$ is likewise provided with a suction pipe $n$ closable by a valve $n'$, and a valve $c'$ is provided in pipe $c$. When operating with superpressure, the valves $g'$ and $n'$ are closed and valve $c'$ is so far opened that not all of the vapor can flow therethrough, but only a definite fraction thereof. Therefore the remaining steam must flow upwardly through column $b$ and can escape only at $s$. In consequence, the driving off of all the sulphuric acid is effected in the upper part of the apparatus.

When operating with subpressure, the valve $g'$ of the rectifying receptacle $a$ and the valve $n'$ of the collecting receptacle $o$ are opened, and the escape of water vapor is regulated by the valve $c'$.

The vapours of the sulphuric acid from the boiler $d$ meet the still dilute sulphuric acid from above in the lower part of the evaporation-column (where hardly any liquid nitric acid is left) and expel from said dilute acid the water as steam by their high temperature being themselves thereby condensed at the same time. Consequently the sulphuric acid attains such a high temperature (300° C.) that not a trace of nitric acid can remain with it. The sulphuric acid thus boils over in a highly concentrated state from the upper part of the boiler $d$ into the cooler K to be pumped back direct into the circuit entering again at $h$ into the concentration process.

As the whole of the water introduced in the process by the dilute nitric acid is removed according to the invention from the lower part of the evaporation-column there remains in the boiler $d$ only highly concentrated sulphuric acid of 66° Bé. This is of additional technical advantage since it permits the boiler to be constructed of cast iron, which is not corroded by strong acid while with diluted acid it would soon be destroyed.

By the present invention all components in the desired form are so obtained in one closed working current, namely—

1. Strong nitric acid.
2. Pure steam suitable for other uses.
3. Sulphuric acid of the original used strength which needs no further treatment to be again employed.

I claim as my invention:

1. A process of concentrating nitric acid in an evaporation column connected at its bottom with a boiler for sulfuric acid, comprising the steps of introducing a mixture of nitric and sulfuric acids at the top of the column; passing the vapors from the boiler upwardly through the column in counter-current with said mixture to heat the same and thereby convert the water originally contained in the nitric acid into steam; and withdrawing from said column so much of the steam as is necessary to obtain the nitric acid in highly concentrated state and to have the sulfuric acid leave the apparatus in its original degree of concentration so that it can be returned to the circuit without further treatment; while maintaining in the boiler sulfuric acid of sufficient strength to develop only sulfuric acid vapors and none of water, and maintaining in the column a temperature sufficiently high to prevent any traces of nitric acid from entering the boiler.

2. A process of concentrating nitric acid according to claim 1, in which the separated steam is rectified to remove from it any sulphuric and nitric acids, and in which the condensate of these acids is returned to the evaporation process.

In testimony whereof I affix my signature.

WILLI BÜSCHING.